(12) United States Patent
Miller

(10) Patent No.: US 8,129,696 B2
(45) Date of Patent: Mar. 6, 2012

(54) WASTEWATER TREATMENT SYSTEM AND METHOD USING HIGH ENERGY LIGHT

(75) Inventor: Gary Daniel Miller, Houston, TX (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 12/578,514

(22) Filed: Oct. 13, 2009

(65) Prior Publication Data

US 2011/0084011 A1    Apr. 14, 2011

(51) Int. Cl.
*A61L 2/00*    (2006.01)
*G01N 21/00*    (2006.01)

(52) U.S. Cl. .............. 250/432 R; 250/428; 250/431; 250/435; 250/436; 250/455.11; 210/748.1; 210/748.01; 210/188; 210/748.13

(58) Field of Classification Search .............. 250/428, 250/431, 432 R, 435, 436, 455.11; 210/198, 210/1.88, 748.01, 748.1, 748.13
See application file for complete search history.

(56) References Cited

U.S. PATENT DOCUMENTS 3,565,777 A * 2/1971 Lauer ......................... 204/157.3
5,034,134 A * 7/1991 George et al. ................ 210/651
(Continued)

*Primary Examiner* — David A Vanore
(74) *Attorney, Agent, or Firm* — Fletcher Yoder PC

(57) ABSTRACT

Embodiments of systems including wastewater treatment systems that utilize high energy light to destruct organics in wastewater are provided. In some embodiments, such systems may include a gas purifier that is configured to purify a gas. The wastewater treatment system treats wastewater from the gas purifier via the use of ultraviolet light. Accordingly, the wastewater treatment system may include an ultraviolet light system that directs ultraviolet light through the wastewater.

20 Claims, 5 Drawing Sheets

U.S. PATENT DOCUMENTS

| | | | |
|---|---|---|---|
| 5,122,165 A * | 6/1992 | Wang et al. | 95/92 |
| 5,948,378 A * | 9/1999 | Koveal et al. | 423/236 |
| 6,107,353 A * | 8/2000 | Koveal et al. | 518/705 |
| 7,135,108 B1 * | 11/2006 | Barnes | 210/120 |
| 7,253,332 B2 * | 8/2007 | Kojima et al. | 588/320 |
| 7,390,222 B2 * | 6/2008 | Ciancanelli et al. | 439/617 |
| 7,604,505 B2 * | 10/2009 | Zayas | 439/617 |
| 7,774,102 B2 * | 8/2010 | Butler et al. | 700/276 |
| 7,794,608 B2 * | 9/2010 | Denkewicz et al. | 210/760 |
| 7,857,972 B2 * | 12/2010 | Foret | 210/243 |
| 7,993,580 B2 * | 8/2011 | Anderle et al. | 422/3 |
| 8,021,189 B2 * | 9/2011 | Zayas et al. | 439/617 |
| 2004/0045886 A1 * | 3/2004 | Abe et al. | 210/198.1 |
| 2010/0155328 A1 * | 6/2010 | O'Regan, Jr. | 210/614 |
| 2011/0042327 A1 * | 2/2011 | Miller | 210/748.13 |
| 2011/0084011 A1 * | 4/2011 | Miller | 210/198.1 |

* cited by examiner

US 8,129,696 B2

WASTEWATER TREATMENT SYSTEM AND METHOD USING HIGH ENERGY LIGHT

BACKGROUND OF THE INVENTION

The subject matter disclosed herein relates to wastewater treatment systems.

Integrated gasification combined cycle (IGCC) power plants are capable of generating energy from various carbonaceous feedstock, such as coal or natural gas, relatively cleanly and efficiently. IGCC technology may convert the carbonaceous feedstock into a gas mixture of carbon monoxide (CO) and hydrogen ($H_2$), i.e., syngas, by reaction with oxygen and steam in a gasifier. Such power plants typically utilize a gas purifier to clean, process, and utilize the gases as fuel. These gas purifiers typically generate a wastewater stream, which is routed to a biological treatment facility. Unfortunately, such wastewater streams often contain organics that lead to foaming and other complications in the downstream treatment facilities.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas purifier configured to purify a gas and a wastewater treatment system configured to treat wastewater from the gas purifier, wherein the wastewater treatment system comprises an ultraviolet light system configured to direct ultraviolet light through the wastewater.

In a second embodiment, a system includes an acid gas removal (AGR) system configured to purify a gas from a gasifier. The system also includes an ultraviolet light system configured to direct ultraviolet light through wastewater from the AGR system, wherein the ultraviolet light system comprises an ultraviolet light source and a light transmissive water conduit.

In a third embodiment, a system includes a power plant water treatment system configured to treat wastewater from a power plant component. The power plant water treatment system comprises an ultraviolet light enclosure having a light reflective coating, a plurality of light transmissive water conduits extending through the ultraviolet light enclosure and a plurality of ultraviolet light sources configured to transmit light throughout the ultraviolet light enclosure and through the plurality of light transmissive water conduits.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
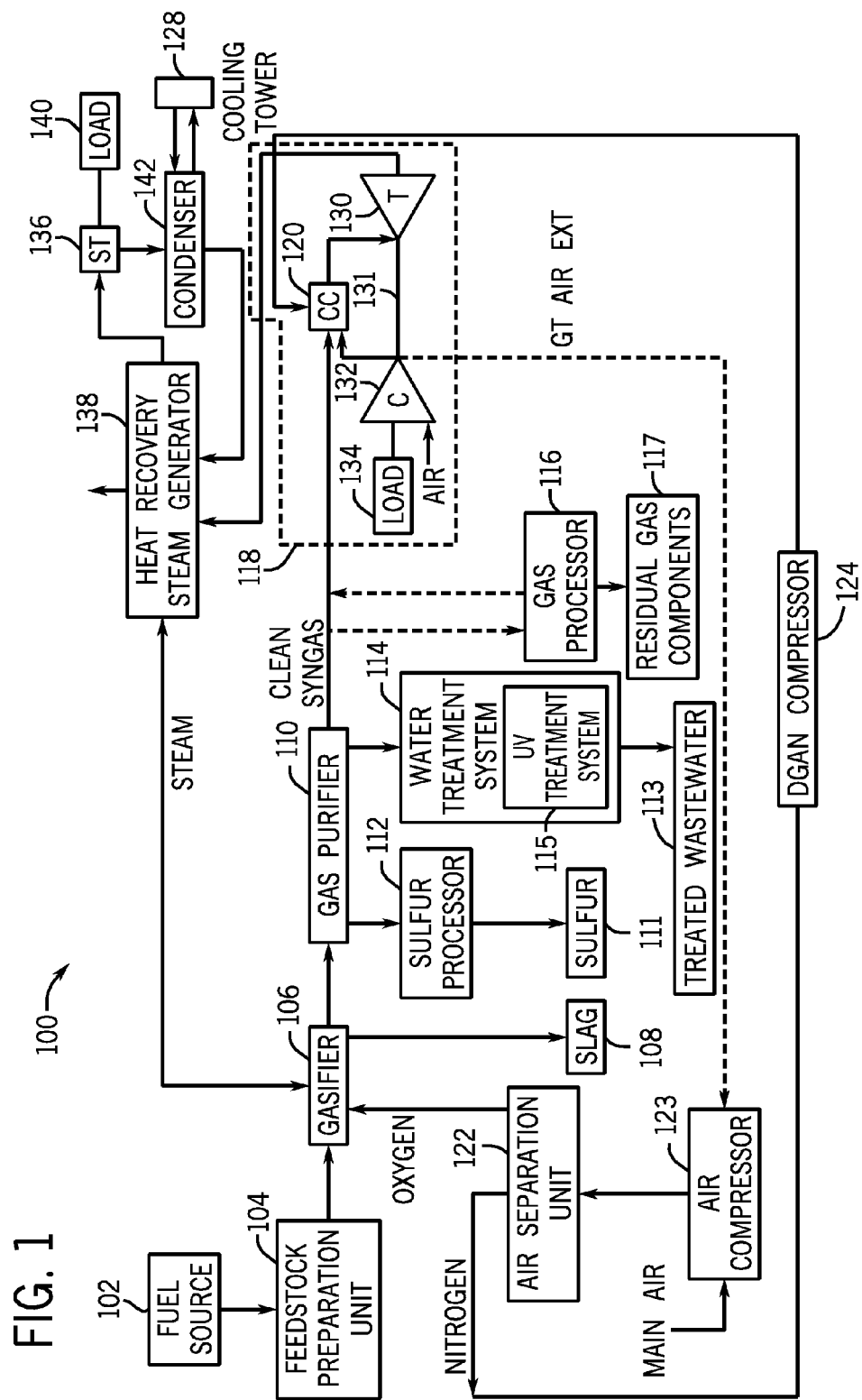
FIG. 1 is a block diagram of an embodiment of an integrated gasification combined cycle (IGCC) power plant having an ultraviolet (UV) treatment system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described below, embodiments of a water treatment system utilize high energy light to purify wastewater, for example, by substantially reducing or eliminating organics from the wastewater. The wastewater may originate from a variety of sources, such as an acid gas removal (AGR) system in an integrated gasification combined cycle (IGCC) power plant. Thus, the high energy light may be selected specifically to reduce or remove particular organics in the wastewater. In certain embodiments, the high energy light source includes an ultraviolet (UV) light source, which provides electromagnetic radiation with a wavelength of approximately 10 to 400 nm and an energy per photon of approximately 3 to 124 eV. For example, the UV light source may provide at least 70, 80, or 90 percent of the light at a peak of organic removal effectiveness, e.g., 185 nm or 265 nm. However, any effective range of high energy light, e.g., UV light, may be used in the disclosed embodiments.

In certain embodiments, a water treatment system may include a reactor having one or more UV light bulbs coupled to a UV power supply. The UV light bulbs may direct UV light toward one or more wastewater passages, such as light transmissive tubes, extending through the reactor. For example, the reactor may include an enclosure having one or more light transmissive tubes extending through an inner chamber, wherein UV light is directed throughout the inner chamber via internal UV light bulbs or external UV light bulbs (e.g., through ports and/or light transmission tubes). The UV power supply also may be internal or external to the reactor. In one embodiment, the reactor may include a plurality of light transmissive tubes arranged in parallel with a vertical axis of the reactor, wherein one or more annular-shaped UV light bulbs circumscribe the plurality of light transmissive tubes. The high energy light generated by the UV light sources may reflect off of inner walls of the reactor, such that UV light fills the inner chamber of the reactor. In some embodiments, the plurality of light transmissive tubes may be disposed between first and second manifolds disposed at first and second opposite ends of the reactor (e.g., inlet and outlet ends). Thus, the first manifold may receive wastewater through the inlet and distribute the wastewater through the plurality of light transmissive tubes, while the second manifold collects the wastewater from the tubes and directs it through the outlet. However, any suitable arrangement of UV light sources and wastewater paths may be employed within the scope of the disclosed water treatment system.

FIG. 1 is a diagram of an embodiment of an integrated gasification combined cycle (IGCC) system 100 that may produce and burn a synthetic gas, i.e., syngas. As discussed in detail below, the IGCC system 100 may incorporate one or more UV treatment systems (e.g., 115) to treat wastewater from various IGCC components. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized. A partial oxidation process may then occur in the gasifier 106. The partial oxidation may include introducing oxygen to the feedstock. The feedstock gases may react with the oxygen to form carbon dioxide and carbon monoxide, which provide heat for the subsequent gasification reactions. The temperatures during the combustion process may range from approximately 700 degrees Celsius to 1600 degrees Celsius. Steam and $CO_2$ may also be introduced into the gasifier 106 during the gasification step. The feedstock may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as CH4, HCl, HF, COS, NH3, HCN, and H2S (based on the sulfur content of the feedstock). This resultant gas may be termed dirty syngas, since it contains, for example, H2S. The gasifier 106 may also generate waste, such as slag 108, which may be a wet ash material. This slag 108 may be removed from the gasifier 106 and disposed of, for example, as road base or as another building material. To clean the dirty syngas, a gas cleaning unit or purifier 110 may be utilized. The gas cleaning unit 110 may scrub the dirty syngas to remove the HCl, HF, COS, HCN, and H2S from the dirty syngas, which may include separation of sulfur 111 in a sulfur processor 112 by, for example, an acid gas removal process in the gas purifier 110.

The gas cleaning unit 110 also may utilize a water treatment system 114 to remove organics from wastewater. For example, the water treatment system 114 may utilize a UV treatment system 115 to substantially reduce or eliminate organics in the wastewater, generating UV treated wastewater 113. In the illustrated embodiment, the organics in the wastewater may result from incomplete reactions in the gasifier 106 and/or gas cleaning unit 110. The UV treatment system 115 applies high energy light (e.g., UV light) to the wastewater to remove these organics. The foregoing feature may have the effect of reducing foaming in thermal wastewater treatment systems, reducing the amount of organics disposed in biological treatment ponds, and reducing the biological treatment load as compared to traditional systems that do not employ UV treatment of the wastewater stream.

Subsequently, the gas from the gas cleaning unit 110 may include clean syngas, (e.g., the sulfur 111 has been removed from the syngas), with trace amounts of other chemicals, e.g., NH3 (ammonia) and CH4 (methane). A gas processor 116 may be utilized to remove residual gas components 117 from the clean syngas such as, ammonia and methane, as well as methanol or any residual chemicals. However, removal of residual gas components 117 from the clean syngas is optional, since the clean syngas may be utilized as a fuel even when containing the residual gas components 117, e.g., tail gas. At this point, the clean syngas may include approximately 3% CO, approximately 55% H2, and approximately 40% CO2 and is substantially stripped of H2S. This clean syngas may be transmitted to a combustor 120, e.g., a combustion chamber, of a gas turbine engine 118 as combustible fuel. Alternatively, the CO2 may be removed from the clean syngas prior to transmission to the gas turbine engine.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
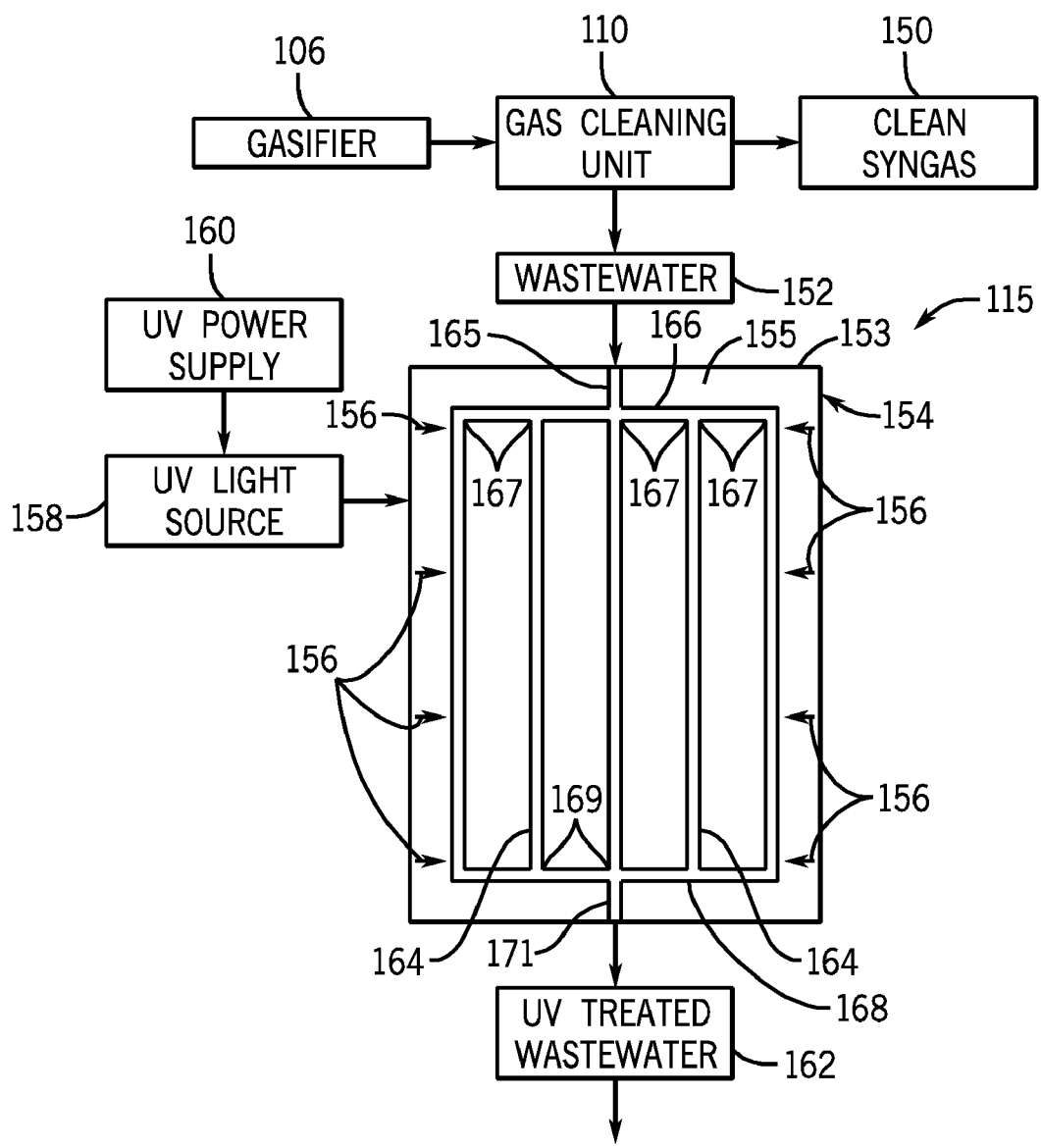
FIG. 2 is a diagram of an embodiment of the UV treatment system of FIG. 1, having a UV light source that delivers high energy light to a reactor.

FIG. 2 is a diagram of an embodiment of the UV treatment system 115 of FIG. 1. As previously described, the gasifier 106 outputs dirty syngas to the gas cleaning unit 110, which removes impurities, such as HCl, HF, COS, HCN, and H2S, thereby generating clean syngas 150. The gas cleaning unit 110 generates wastewater 152, which is directed through a reactor 154 and treated with high energy light 156 (e.g., wavelength of approximately 10 nm to 400 nm, and energy from approximately 3 eV to 124 eV). Accordingly, a UV light source 158, which receives power from a UV power source 160, supplies the reactor 154 with high energy light 156 that is directed toward the wastewater 152. The UV light source 158 may include UV light bulbs, UV light columns, light transmission tubes, UV light rings, or a combination thereof. The wastewater 152 is treated with the high energy light 156 from the UV light source 158 as it flows through the reactor 154, finally emerging as UV treated wastewater 162.

The reactor 154 may apply the high energy light 156 (e.g., UV light) either directly or indirectly to the wastewater 152. For example, the high energy light 156 may directly treat an open flow of the wastewater 152, e.g., a horizontal conduit open on the top or a vertical flow (e.g., drip, stream, or sheet) of wastewater dropping through an inner chamber of the reactor 154. By further example, the high energy light 156 may indirectly treat the wastewater 152, e.g., by passing through a light transmissive medium, such as a clear plastic or glass wall, prior to reaching the wastewater 152.

In the illustrated embodiment, the reactor 154 includes an enclosure 153 defining an interior chamber 155, which houses a plurality of light transmissive tubes 164 and first and second light transmissive manifolds 166 and 168. The first manifold 166 includes a wastewater inlet 165 and a plurality of outlets 167, which couple to the plurality of light transmissive tubes 164 Likewise, the second manifold 168 includes a plurality of inlets 169 coupled to the plurality of light transmissive tubes 164, and also a wastewater outlet 171. As illustrated, the tubes 164 and the manifolds 166 and 168 consume a fraction of the interior chamber 155, such that the light 156 can pass through empty space and light transmissive walls of each component 164, 166, and 168.

The plurality of light transmissive tubes 164 and manifolds 166 and 168 may be made of a transparent or translucent material, such as clear plastic, glass, or any other suitable material (i.e., any material that high energy light can penetrate). In certain embodiments, the plurality of tubes 164 may include 1 to 1000, 1 to 100, or 1 to 10 tubes of equal or different diameters. For example, each tube 164 may have a diameter of less than approximately 0.5, 1, 1.5, 2, 3, 4, or 5 inches, or generally ranging between approximately 0.5 to 2 inches. By further example, each tube 164 may have a length of approximately 12 to 120 inches, 12 to 48 inches, 12 to 24 inches, or any suitable length. As appreciated, the number, diameter, and length of the tubes 164 may vary depending on the characteristics of the wastewater 152 and the UV light 156, e.g., organic loading (i.e., amount of oils), residence time, turbidity, and flow rate of the wastewater 152, as well as the penetration and effectiveness of the UV light 156. For instance, the flow rate of the wastewater 152 may range from approximately 0 to 20 gallons/minute, and the size and number of the plurality of tubes 164 may be determined based on the specific flow rate in a given application.

During operation, the wastewater 152 flows through the plurality of light transmissive tubes 164 in a direction away from the first manifold 166 and toward the second manifold 168. In particular, the first manifold 166 receives the wastewater 152 through the inlet 165, and then splits the wastewater 152 into the outlets 167 for even distribution to the plurality of light transmissive tubes 164. Upon reaching the second manifold 168, the wastewater 152 enters the inlets 169 and reunites into the outlet 171. As the wastewater 152 flows through the reactor 154, the high energy light 156 (e.g., UV light) penetrates into the plurality of tubes 164 and manifolds 166 and 168 and interacts with the contents of the wastewater 152. For example, as the wastewater 152 flows through the first manifold 166, the tubes 164, and the second manifold 168, the UV light 156 penetrates walls of these components 164, 166, and 168 to UV treat the enclosed wastewater 152. For example, the high energy light 156 may destroy organic material, such as solvent remnants from the AGR process, while the wastewater 152 traverses through the plurality of tubes 164, such that the UV treated wastewater 162 contains reduced amounts of organic material. Since the organic material has been removed from the UV treated wastewater 162, foaming in downstream system components may be reduced or eliminated in certain embodiments. Additionally, the organic content of the wastewater that may be routed to a biological treatment pond may be lessened, thereby reducing the biological treatment load requirements in downstream system components.

Figure 3:
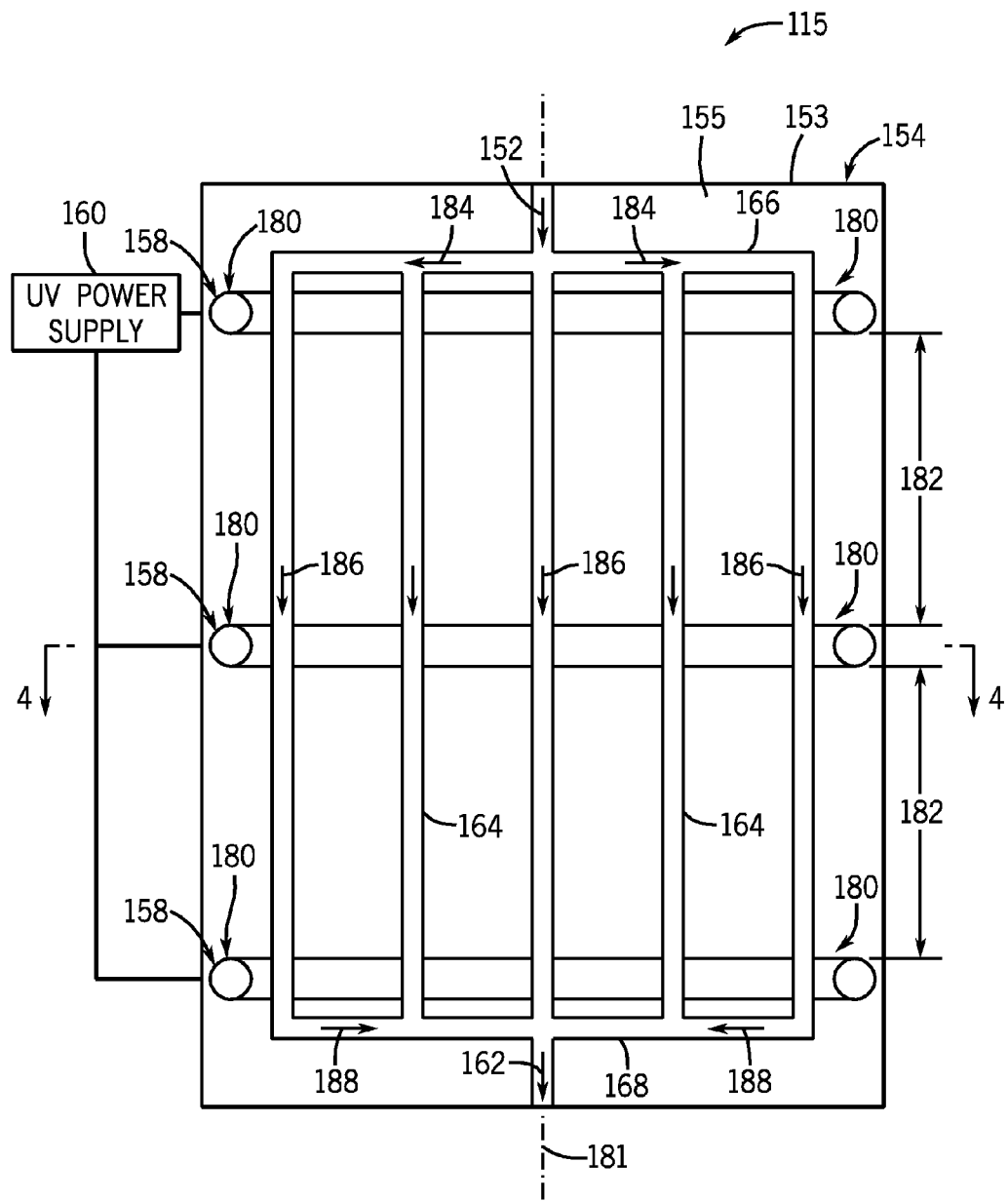
FIG. 3 is a diagram of an embodiment of the UV treatment system of FIG. 1, having UV light rings disposed about a circumference of a reactor.

FIG. 3 is a diagram of an embodiment of the UV treatment system 115 having UV light rings 180 (e.g., annular UV light bulbs) as UV light sources 158 circumscribing the plurality of light transmissive tubes 164. In the illustrated embodiment, the UV light rings 180 are disposed internal, rather than external, to the enclosure 153 of the reactor 154. For example, each UV light ring 180 may extend 360 degrees about the plurality of light transmissive tubes 164 along an interior surface of the enclosure 153, wherein each UV light ring 180 is coaxial with a longitudinal axis 181 of the reactor 154. In other embodiments, the UV light sources 158 may be disposed external to the enclosure 153 as discussed in further detail below.

The UV light rings 180 may have a variety of arrangements inside the enclosure 153. Although FIG. 3 illustrates only three UV light rings 180, the UV treatment system 115 may include any number of UV light rings 180, e.g., 1 to 10, 1 to 50, or 1 to 100. Moreover, the size and spacing may be selected based on characteristics of the wastewater 152, e.g., concentration of organics. For example, the UV light rings 180 may be uniformly or non-uniformly sized and spaced within the enclosure 153. As illustrated, the reactor 154 supports the UV light rings 180 in a uniform arrangement inside the enclosure 153. However, a distance 182 between adjacent edges of the UV light rings 180 may be equidistant or may vary between UV light rings 180. The distance 182 may be approximately 1 to 3 inches, 1 to 6 inches, 1 to 12 inches, or 1 to 24 inches, or any other suitable distance such that the high energy light 156 reaches the wastewater 152 flowing through each of the plurality of tubes 164. In some embodiments, the UV light rings 180 may be larger and more closely spaced near the first manifold 166, and smaller and less closely spaced near the second manifold 168. However, any suitable arrangement of the UV light rings 180 may be employed in the UV treatment system 115.

In certain embodiments, the enclosure 153 is a hollow cylindrical structure defining a hollow cylindrical space as the inner chamber 155. In such an embodiment, each UV light ring 180 may be directly or closely mounted along the inner surface of the enclosure 153. In other words, an outer diameter of the UV light rings 180 may be approximately equal to an inner diameter of the enclosure 153. In other embodiments, one or more UV light rings 180 may be mounted directly to 1 or more light transmissive tubes 164, e.g., less than or equal to the entire number of tubes 164 in the enclosure 153. For example, each group of 2 to 10 tubes 164 may be circumscribed by one or more UV light rings 180, which mount to the tubes 164.

During operation, the untreated wastewater 152 enters the reactor 154 and is routed to the first manifold 166. The first manifold 166 evenly distributes the wastewater 152 to the plurality of tubes 164, as illustrated by arrows 184, such that an equal amount of wastewater flows through each tube of the plurality of tubes 164. The wastewater 152 then flows through the plurality of tubes 164 in a downstream direction away from the first manifold 166 and toward the second manifold 168, as illustrated by arrows 186. As the wastewater 152 flows through the plurality of tubes 186, UV light originating from the UV light rings 180 penetrates the light transmissive outer walls of the plurality of tubes 164 and destroys the organics in the wastewater 152. The wastewater 152 exiting the plurality of tubes 164, as illustrated by arrows 188, is received by the second manifold 168 and is routed out of the reactor 154. In this way, the wastewater 152 is routed through the plurality of tubes 164 in the reactor 154 to destroy residual organic material, thereby yielding UV treated wastewater 162.

Figure 4:
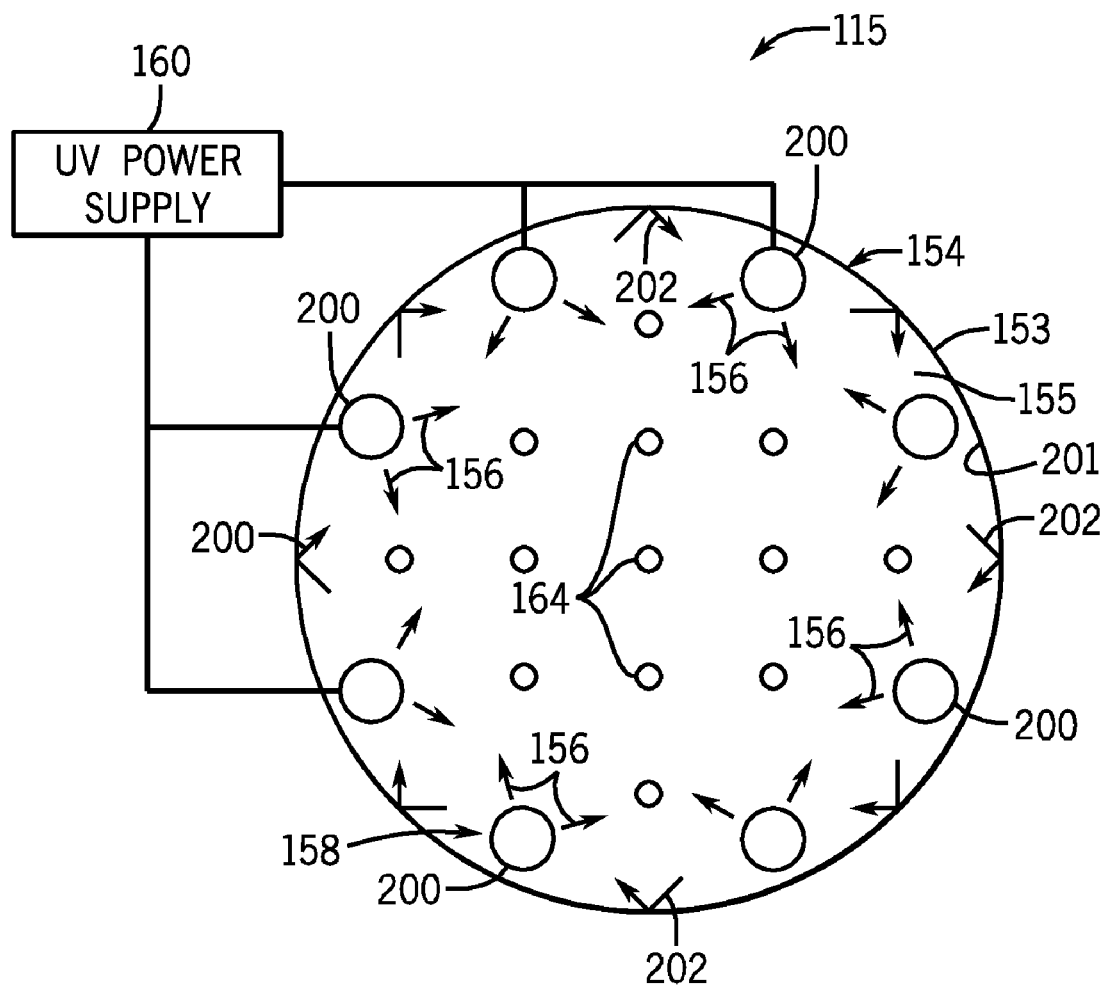
FIG. 4 is a cross-sectional view of an embodiment of a reactor having UV light bulbs disposed at discrete positions about a circumference of the reactor.

FIG. 4 is a cross-section of an embodiment of the reactor 154 of the UV treatment system 115, taken crosswise to the longitudinal axis 181 of the reactor 154 as indicated by line 4-4 of FIG. 3. As illustrated in FIG. 4, the reactor 154 has similar elements as FIG. 3, yet with different UV light sources 158. In contrast to FIG. 3, the embodiment of FIG. 4 includes UV light bulbs 200 as the UV light sources 158 disposed at discrete positions within the inner chamber 155 of the enclosure 153. In particular, the UV light bulbs 200 are arranged in an annular pattern that circumscribes the plurality of light transmissive tubes 164, e.g., along a cylindrical inner surface of the enclosure 153. In this embodiment, the UV light sources 158 (e.g., UV light bulbs 200) are located inside the reactor 154, while the UV power supply 160, which provides energy to the UV light sources 158, are located external to the reactor 154.

In certain embodiments, the tubes 164 and/or the UV light bulbs 200 may have a uniform or non-uniform arrangement inside the inner chamber 155 of the enclosure 153. For example, the illustrated tubes 164 are evenly spaced in parallel to one another in a grid that covers the illustrated plane. In other embodiments, the plurality of tubes 164 may be spaced in a variety of non-uniform patterns, such as a plurality of groups or clusters, throughout the inner chamber 155 of the enclosure 153. For example, the plurality of tubes 164 may be arranged in a matrix pattern (e.g., parallel rows and columns), a checkerboard pattern (e.g., staggered rows and columns), a ring-shaped pattern (e.g., concentric rings of tubes), or any other suitable pattern that enables high energy light 156 to reach the wastewater 152 flowing through the plurality of tubes 164. Likewise, the illustrated UV light bulbs 200 may be uniformly spaced circumferentially along the inner surface of the enclosure 155, or the bulbs 200 may be non-uniformly spaced relative to one another and the inner surface. In certain embodiments, the reactor 154 may include a plurality of groups of UV light bulbs 200, such as a plurality of ring-shaped patterns (e.g., concentric rings of bulbs 200), disposed around and between the tubes 164. However, any suitable arrangement of tubes 164 and bulbs 200 may be used with the illustrated reactor 154.

During operation, the UV power supply 160 provides the UV light bulbs 200 with power, which the UV light bulbs 200 convert to high energy light 156 (e.g., UV light) that is directed to the plurality of tubes 164 disposed inside the reactor 154. In some embodiments, the inside walls of the reactor 154 may be coated with reflective coating 201, such as a reflective metallic material, to facilitate light distribution within the inner chamber 155. For example, the reflective coating 201 may include silver reflective paint, minor backing, white paint, clear paint containing ground and reflective glass, or other reflective media. In such embodiments, UV light 156 may reflect off the reflective coating 201 along the inside walls of the reactor 154, as shown by arrows 202, and be redirected toward the plurality of tubes 164. In this way, high energy light 156 originating from the UV light bulbs 200 and redirected light 202 that reflects off the walls destroy the organic matter in the wastewater as it flows through the plurality of tubes 164.

Figure 5:
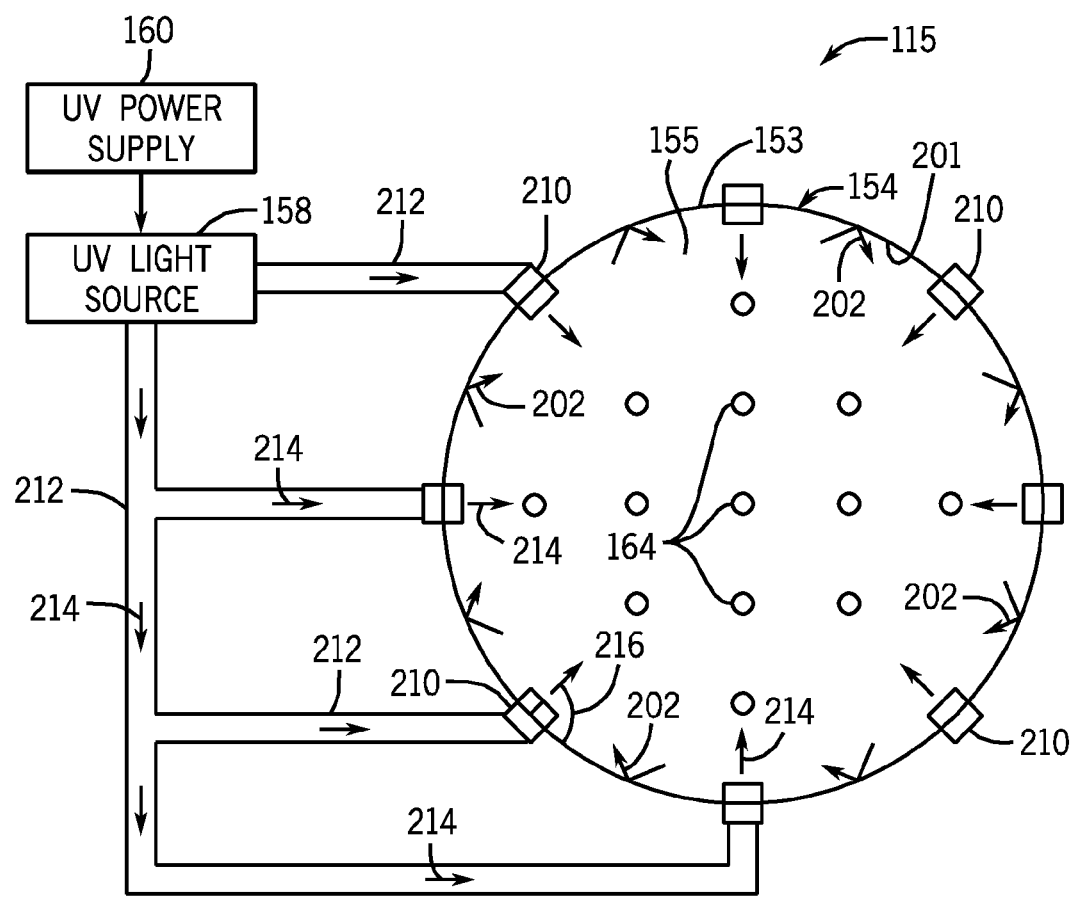
FIG. 5 is a cross-sectional view of an embodiment of a reactor having UV light ports coupled to light transmission tubes at discrete positions around a circumference of the reactor.

FIG. 5 is a cross-section of an embodiment of the reactor 154 of the UV treatment system 115, taken crosswise to the longitudinal axis 181 of the reactor 154 as indicated by line 4-4 of FIG. 3. As illustrated in FIG. 5, the reactor 154 has similar elements as FIGS. 3 and 4, yet with externally mounted UV light sources 158. In contrast to FIG. 4, the reactor 154 includes UV light ports 210 disposed in discrete positions around the circumference of enclosure 153 of the reactor 154. In this embodiment, both the UV light source 158 and the UV power supply 160 are located external to the reactor 154. The UV light source 158 routes high energy light (e.g., UV light) to UV light ports 210 in the enclosure 153, by passing the high energy light through light transmission tubes 212 (e.g., fiber optic cables) as represented by arrows 214. These UV light ports 210 receive the externally generated UV light 214, and direct the UV light 214 toward the plurality of light transmissive tubes 164.

The configuration of UV light ports 210, light transmission tubes 212, and light source 158 may vary between implementations. Although FIG. 5 illustrates a single UV light source 158, the reactor 154 may include any number of UV light sources 158. For example, each UV light port 210 may have one light transmission tube 212 coupled to one independent light source 158. By further example, each light source 158 may be coupled to one or more UV light ports 210, which may be less than or equal to the total number of ports 210. As illustrated, the UV light ports 210 are spaced uniformly about the circumference of the enclosure 153. In some embodiments, the UV light ports 210 may be spaced non-uniformly about the circumference of the enclosure 153, e.g., positioned closer to internal tubes 164. The UV light ports 210 also may be disposed at any suitable axial position and circumferential position about the enclosure 153, e.g., 1 to 100 different axial positions and 1 to 100 different circumferential positions. Furthermore, the UV light ports 210 may be perpendicular or non-perpendicular to the inner surface of the enclosure 153. For example, the UV light ports 210 may be oriented at an angle 216 relative to an inner surface 218, wherein the angle may range between 0 to 90 degrees or 30 to 60 degrees. The illustrated angle 216 is approximately 90 degrees, although other embodiments may use an angle 216 of approximately 30, 45, or 60 degrees.

As previously mentioned with respect to FIG. 4, the plurality of tubes 164 may be disposed in any of a variety of suitable patterns across the planar grid such that high energy light reaches each of the tubes. As in previous embodiments, high energy light 214 may reflect off of a reflective coating 201 along the inner surface 218 of the enclosure 153, thereby redirecting the light 202 to the plurality of tubes 164. That is, both the high energy light 214 originating from the ports 210 and the redirected high energy light 202 destroys organics in the wastewater 152 as it flows through the plurality of tubes 164.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gas purifier configured to purify a gas; and
a wastewater treatment system configured to treat wastewater from the gas purifier, wherein the wastewater treatment system comprises an ultraviolet light system configured to direct ultraviolet light through the wastewater.

2. The system of claim 1, wherein the ultraviolet light system comprises a light transmissive water conduit.

3. The system of claim 2, wherein the ultraviolet light system comprises a ultraviolet light enclosure disposed about the light transmissive water conduit.

4. The system of claim 3, wherein the ultraviolet light system comprises an ultraviolet light source disposed inside of the ultraviolet light enclosure.

5. The system of claim 4, wherein the ultraviolet light source comprises an ultraviolet light bulb, an ultraviolet light column, an ultraviolet light ring, or a combination thereof.

6. The system of claim 3, wherein the ultraviolet light system comprises an ultraviolet light source disposed outside of the ultraviolet light enclosure, and a light transmission tube extending from the ultraviolet light source to an ultraviolet port in the ultraviolet light enclosure.

7. The system of claim 3, wherein the ultraviolet light enclosure comprises a light reflective coating disposed on an interior surface.

8. The system of claim 1, wherein the ultraviolet light system comprises a light transmissive structure including a first water manifold, a second water manifold, and a plurality of water conduits extending from the first water manifold to the second water manifold.

9. The system of claim 1, wherein the gas purifier comprises an acid gas removal (AGR) system configured to purify the gas from a gasifier.

10. The system of claim 9, comprising the gasifier and a gas turbine engine configured to receive the gas from the AGR system.

11. A system, comprising:
an acid gas removal (AGR) system configured to purify a gas from a gasifier; and
an ultraviolet light system configured to direct ultraviolet light through wastewater from the AGR system, wherein the ultraviolet light system comprises:
an ultraviolet light source; and
a light transmissive water conduit.

12. The system of claim 11, wherein the ultraviolet light system comprises a ultraviolet light enclosure disposed about the light transmissive water conduit.

13. The system of claim 12, wherein the ultraviolet light system comprises an ultraviolet light source disposed inside of the ultraviolet light enclosure.

14. The system of claim 13, wherein the ultraviolet light source comprises an ultraviolet light bulb, an ultraviolet light column, an ultraviolet light ring, or a combination thereof.

15. The system of claim 12, wherein the ultraviolet light system comprises an ultraviolet light source disposed outside of the ultraviolet light enclosure, and a light transmission tube extending from the ultraviolet light source to an ultraviolet port in the ultraviolet light enclosure.

16. The system of claim 12, wherein the ultraviolet light enclosure comprises a light reflective coating disposed on an interior surface.

17. The system of claim 11, wherein the ultraviolet light system comprises a light transmissive structure including a first water manifold, a second water manifold, and a plurality of water conduits extending from the first water manifold to the second water manifold.

18. A system, comprising:
a power plant water treatment system configured to treat wastewater from a power plant component, wherein the power plant water treatment system comprises:
an ultraviolet light enclosure having a light reflective coating;
a plurality of light transmissive water conduits extending through the ultraviolet light enclosure; and
a plurality of ultraviolet light sources configured to transmit light throughout the ultraviolet light enclosure and through the plurality of light transmissive water conduits.

19. The system of claim 18, wherein the power plant component comprises an acid gas removal (AGR) system.

20. The system of claim 18, wherein the plurality of light transmissive water conduits comprise a first water manifold, a second water manifold, and a plurality of water tubes extending in parallel from the first water manifold to the second water manifold.

* * * * *